United States Patent
Takeoka

(10) Patent No.: US 8,571,742 B2
(45) Date of Patent: Oct. 29, 2013

(54) TRAVELING VEHICLE SYSTEM AND METHOD OF AVOIDING INTERFERENCE WITH TRAVELING VEHICLE

(75) Inventor: Hidehiro Takeoka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 409 days.

(21) Appl. No.: 13/018,536

(22) Filed: Feb. 1, 2011

(65) Prior Publication Data

US 2011/0202247 A1 Aug. 18, 2011

(30) Foreign Application Priority Data

Feb. 12, 2010 (JP) ................................. 2010-028517

(51) Int. Cl.
*G06F 19/00* (2011.01)

(52) U.S. Cl.
USPC .............. 701/23; 701/28; 701/300; 701/301

(58) Field of Classification Search
USPC .................. 701/23–28, 300–302, 409–411; 340/435, 436
See application file for complete search history.

(56) References Cited

U.S. PATENT DOCUMENTS

| | | | |
|---|---|---|---|
| 6,151,539 A | | 11/2000 | Bergholz et al. |
| 8,060,306 B2 * | | 11/2011 | Puhalla et al. ................ 701/301 |
| 8,126,642 B2 * | | 2/2012 | Trepagnier et al. ........... 701/423 |
| 8,229,618 B2 * | | 7/2012 | Tolstedt et al. ................ 701/23 |
| 2007/0107966 A1 | | 5/2007 | Brunner et al. |
| 2008/0040040 A1 | | 2/2008 | Goto et al. |

FOREIGN PATENT DOCUMENTS

| | | |
|---|---|---|
| DE | 199 49 499 A1 | 4/2001 |
| EP | 0 913 751 A1 | 5/1999 |
| EP | 1 712 971 A2 | 10/2006 |
| EP | 1 788 467 A2 | 5/2007 |
| GB | 2 413 449 A | 10/2005 |
| JP | 2002-215238 A | 7/2002 |
| JP | 2002-278624 A | 9/2002 |
| JP | 2006-017496 A | 1/2006 |

OTHER PUBLICATIONS

Official Communication issued in corresponding European Patent Application No. 11152170.4, mailed on Jun. 17, 2011.
Official Communication issued in corresponding Japanese Patent Application No. 2010-028517, mailed on Dec. 12, 2011.

* cited by examiner

*Primary Examiner* — Richard Camby
(74) *Attorney, Agent, or Firm* — Keating & Bennett, LLP

(57) ABSTRACT

A traveling vehicle is equipped with an obstacle sensor to detect a distance to an obstacle and an orientation relative to the obstacle. A map of a travel route of the traveling vehicle is stored. A detection area where deceleration of the traveling vehicle is required if there is any obstacle in the detection area is repeatedly generated based on the position of the traveling vehicle from the map. Among obstacles detected by the obstacle sensor, an obstacle in the detection area is detected. Deceleration control of the traveling vehicle is implemented to prevent interference with the detected obstacle.

3 Claims, 4 Drawing Sheets

F I G. 1
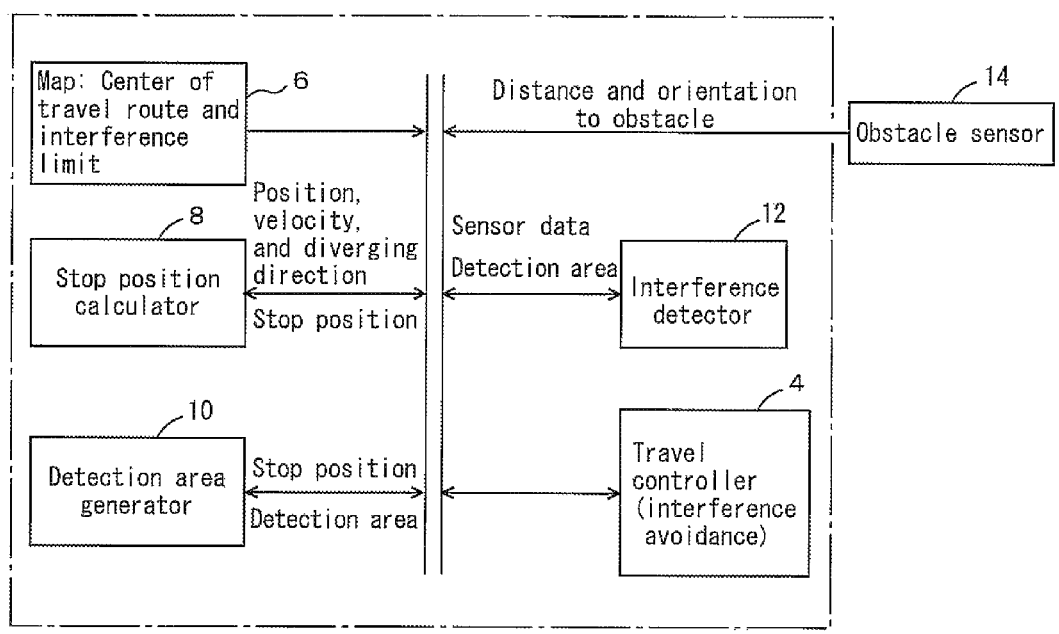

TRAVELING VEHICLE SYSTEM AND METHOD OF AVOIDING INTERFERENCE WITH TRAVELING VEHICLE

BACKGROUND OF THE INVENTION

1. Field of the Invention

The present invention relates to a traveling vehicle system. In particular, the present invention relates to detection of obstacles.

2. Description of the Related Art

In a known technique, as an obstacle sensor, a distance sensor such as a laser distance meter is used. A monitor area, e.g., having a sector shape is scanned by the distance sensor, and a distance and an orientation relative to an obstacle are determined. Obstacles detected by the obstacle sensor do not always interfere with the traveling vehicle, and some of the detected obstacles may not interfere with the traveling vehicle. It is because the obstacle sensor detects obstacles over a wide range of angles. For example, the obstacle sensor detects obstacles that are positioned on a side of a travel route of the traveling vehicle, and do not interfere with the traveling vehicle.

In this respect, JP2002-215238A proposes to store a plurality of patterns of detection areas, and select a pattern of the detection area in correspondence with the position of a traveling vehicle. Among obstacles detected by an obstacle sensor, only obstacles within the detection area are determined as actual obstacles. However, it is difficult to store a large number of patterns of detection areas. Therefore, optimum patterns may not always be available. For the sake of safety, excessively wide detection areas may be used. As a result, the distance to the leading traveling vehicle becomes excessively large. Further, in practice, obstacles that do not interfere with the traveling vehicles are detected as well. In order to avoid collision with such obstacles, unwanted deceleration control or the like may be implemented. Therefore, the efficiency in the traveling vehicle system becomes low. If the detection area is narrowed to give a priority to the efficiency, dead angles where the obstacles cannot be detected may exist undesirably.

SUMMARY OF THE INVENTION

Preferred embodiments of the present invention provide a system and method to shorten the inter-vehicle distance between traveling vehicles, and generate an area in which obstacles are detected without any dead angle.

A traveling vehicle system according to a preferred embodiment of the present invention includes a traveling vehicle including an obstacle sensor arranged to detect a distance to an obstacle and an orientation relative to the obstacle. The system further includes a map memory configured to store a map of a travel route of the traveling vehicle; a detection area generator configured to repeatedly generate a detection area from the map based on a current position of the traveling vehicle, deceleration of the traveling vehicle being required if any obstacle is present in the detection area; an interference detector configured to detect an obstacle in the detection area, among obstacles detected by the obstacle sensor; and a travel controller configured to control deceleration of the traveling vehicle to prevent interference with the obstacle detected by the interference detector.

In a preferred embodiment of the present invention, the detection area is generated in real time, and obstacles in the detection area are detected by an interference detector. If it is required to avoid the obstacle, deceleration control is implemented. Since the detection area is generated in real time, the detection area is optimum for the position on the travel route. Thus, since no excessively large detection area is used, the inter-vehicle distance is shortened, and the travel efficiency is improved. Since the detection area is based on the position on the travel route, no dead angle is present in detecting obstacles.

Preferably, the detection area generator is configured to determine an interference range ahead of the traveling vehicle where interference with the traveling vehicle may occur, from the map based on the position of the traveling vehicle, determine a position of a front end of the traveling vehicle when the traveling vehicle stops based on a current velocity of the traveling vehicle, and in the interference range, designates an area closer to the traveling vehicle in comparison with the position of the front end as the detection area.

Further, preferably, the travel route includes a diverging section configured to allow the traveling vehicle to move straight or diverge from the diverging section, and the detection area generator is configured to generate the detection area in the vicinity of the diverging section, using a direction in which the traveling vehicle travels through the diverging section. In this manner, a range where interference may occur can be designated as the detection area. For example, when the traveling vehicle diverges from the diverging section, a detection area where the diverging direction instead of the straight direction is positioned at the center is generated, and when the traveling vehicle moves straight through the diverging section, a detection area where the straight direction instead of the diverging direction is positioned at the center is generated.

In this specification, description regarding the traveling vehicle system is directly applicable to the method of avoiding interference with the traveling vehicles, and conversely, description regarding the method of avoiding interference with the traveling vehicles is directly applicable to the traveling vehicle system.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a block diagram showing a traveling vehicle according to a preferred embodiment of the present invention.

DETAILED DESCRIPTION OF THE PREFERRED EMBODIMENTS

Figure 2:
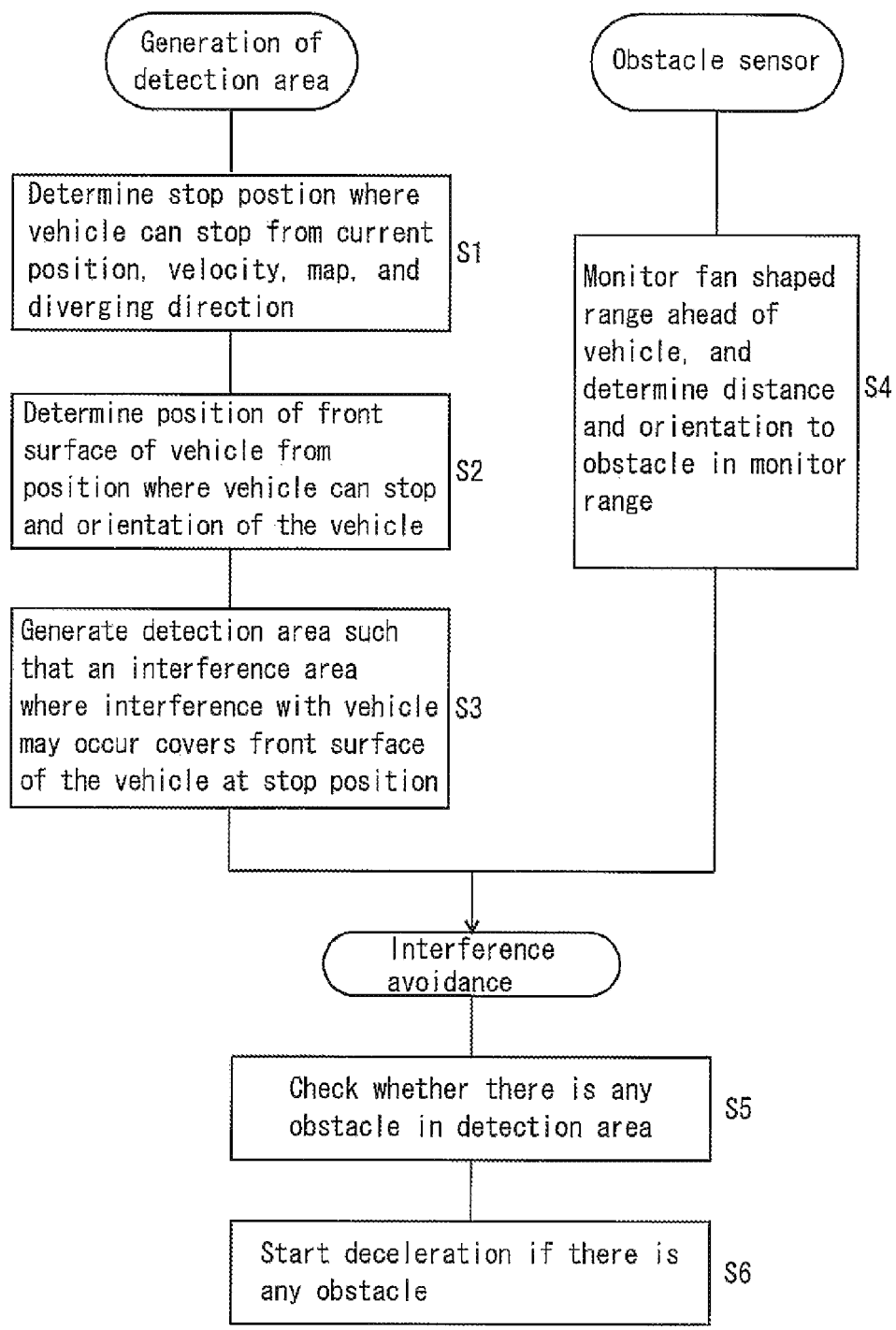
FIG. 2 is a flow chart showing an interference avoidance algorithm in a preferred embodiment of the present invention.

Hereinafter, preferred embodiments for carrying out the present invention in the most preferred form will be described. The scope of the present invention shall be determined according to understanding of a person skilled in the art based on the claims in consideration of the description of the specification and techniques known in this technical field.

FIGS. 1 to 6 show a traveling vehicle system according to a preferred embodiment of the present invention. In this preferred embodiment, overhead traveling vehicles are described as an example. Alternatively, rail guided vehicles that travel on the ground or automated guided vehicles that travel without any rail may be used. These types of traveling vehicles are transportation vehicles that transport articles along a predetermined travel route. In the present preferred embodiment, the traveling vehicle 2 includes a detection area generator 10 or the like, and interference avoidance with obstacles is carried out by the traveling vehicle 2 itself autonomously. Preferably, no host controller on the ground is involved in interference avoidance. However, in a system where the primary side of a linear motor is provided on the ground and the traveling vehicle has the secondary side of the linear motor, a host controller on the ground may define the detection areas, and determine whether the traveling vehicle actually interferes with any obstacle or not. Further, also in the case of adopting a traveling vehicle equipped with a travel motor, the host controller may define the detection areas and determine whether the traveling vehicle interference with any obstacle or not.

In FIG. 1, a reference numeral 2 denotes the traveling vehicle, a reference numeral 4 denotes a travel controller configured to control the travel motor for acceleration or deceleration of traveling. In diverging sections, control of the diverging directions is implemented. The travel controller 4 decelerates the traveling vehicle 2 to avoid interference with the obstacle. A reference numeral 6 denotes a map memory configured to store a trajectory of the center of the travel route to be followed by the traveling vehicle (trajectory of the center in the width direction of the travel rail in the present preferred embodiment) and an interference limit as a limit in the width direction which may cause interference with the traveling vehicle 2. In the specification, the width direction or lateral direction is a direction perpendicular or substantially perpendicular to the traveling direction in the travel route in a horizontal plane. Further, the map memory 6 simply stores only the center of the travel route. For example, the interference limit is a position spaced by a predetermined distance toward both of left and right sides from the center of the travel route. The interference limit may be defined each time it is needed.

A reference numeral 8 denotes a stop position calculator configured to calculate a stop position where the traveling vehicle 2 can stop, based on the position, velocity, and diverging direction of the traveling vehicle 2. The position of the traveling vehicle 2 is represented by the central position of the traveling vehicle. Determination as to whether there is any interference or not involves a front end of the traveling vehicle 2. In this regard, a position ahead of the vehicle position, e.g., by ½ of the vehicle body length is designated as the position of the front end of the traveling vehicle. The position and velocity herein mean the current position and the current velocity. For example, in the case where the traveling vehicle 2 is decelerated at a constant deceleration rate, assuming that the current velocity is v, the travel distance to the stop position is $v^2/2a$ (a is deceleration rate). The position is determined relative to the center of the traveling vehicle. Since the distance from the front end to the center of the traveling vehicle is known, the stop position at the front end of the traveling vehicle and the orientation of the front end are determined. The orientation of the front end of the traveling vehicle is a normal direction of the travel route at the central position of the traveling vehicle. For safety reasons, it is assumed that the traveling vehicle is decelerated at a deceleration rate smaller than the maximum deceleration rate. Otherwise a margin is added to the stop position determined based on the maximum deceleration. The detection area generator 10 considers an area inside the interference limit determined from a map memory 6, and before the stop position determined by the stop position calculator 8 as the detection area.

For example, the obstacle sensor 14 detects obstacles by scanning a predetermined scanning range, e.g., at an angle of 90° to both of left and right sides from a direction in front of the traveling vehicle, at intervals of, e.g., 10 times per second, e.g., using a laser distance sensor or the like. The distance and the orientation relative to the detected obstacle are outputted to an interference detector 12. The detection area defined by the detection area generator 10 is inputted to the interference detector 12 to detect obstacles in the detection area. For example, obstacles are detected at intervals of about 10 times per second. Assuming that the maximum velocity of the traveling vehicle 2 is about 4 m per second, obstacles can be detected each time the traveling vehicle travels about 40 cm, for example. Assuming that the maximum velocity of the traveling vehicle 2 is about 1 m per second, obstacles can be detected each time the traveling vehicle travels about 10 cm, for example. If any obstacle is present in the detection area, the travel controller 4 decelerates the traveling vehicle 2, and stops the traveling vehicle 2 before the obstacle. If the obstacle moves out of the detection area while the traveling vehicle 2 is decelerated, the traveling vehicle 2 is accelerated again. The travel controller 4, the stop position calculator 8, the detection area generator 10, and the interference detector 12 are realized by components such as a microcomputer and a programmable controller.

In a preferred embodiment of the present invention, the detection areas are preferably defined in real time, and the detection area is changed in correspondence with the position on the travel route. For example, obstacles are detected by the obstacle sensor 14 ten times per second. Concurrently, the detection areas are defined ten times per second, for example. An algorithm for this purpose is shown in FIG. 2. In the process of defining the detection area, in step 1, a stop position where the traveling vehicle can stop is determined using the current position and the current velocity of the traveling vehicle with reference to the map (step 1). In the vicinity of the diverging sections, the stop position where the traveling vehicle can stop is determined also with reference to diverging directions. In step 2, a position and an orientation of the front end of the traveling vehicle when the traveling vehicle stops are determined based on the stop position where the traveling vehicle can stop and a normal direction in the travel route at this stop position (step 2). The area where interference with the vehicle may occur is stored in the map, e.g., as an interference limitation.

Otherwise, the area extended from the center of the travel route on the map to both of left and right sides by ½ of the vehicle width of the traveling vehicle may be used as the area where interference with the vehicle may occur. The detection area includes the front end of the vehicle at the stop position where interference with the vehicle may occur (step 3). The process of defining the detection area is performed concurrently with the detection process by the obstacle sensor, and repeated, e.g., about 10 times per second. Preferably, the detection area is defined synchronously with detection of obstacles by the obstacle sensor. In particular, the detection area is generated each time detection by the detection sensor is performed.

The obstacle sensor monitors a sector shaped area, a semicircular area or the like ahead of the traveling vehicle, and monitors the distance and orientation relative to the obstacle in the monitored area (step 4). Although the sensor used in the present preferred embodiment preferably is a combination of a laser distance meter and a mirror where the detection direction can be changed by rotating the mirror, any type of obstacle sensor may be used.

Interference avoidance is carried out by the interference detector and the travel controller. The interference detector checks whether any obstacle is present in the detection area or not. In this check, based on a signal from the obstacle sensor, the obstacle having the orientation and the distance within the detection area is detected (step 5). Then, if any obstacle is present in the detection area, the travel controller starts deceleration control so that the vehicle can stop before the obstacle if the obstacle does not retract from the detection area.

Figure 3:
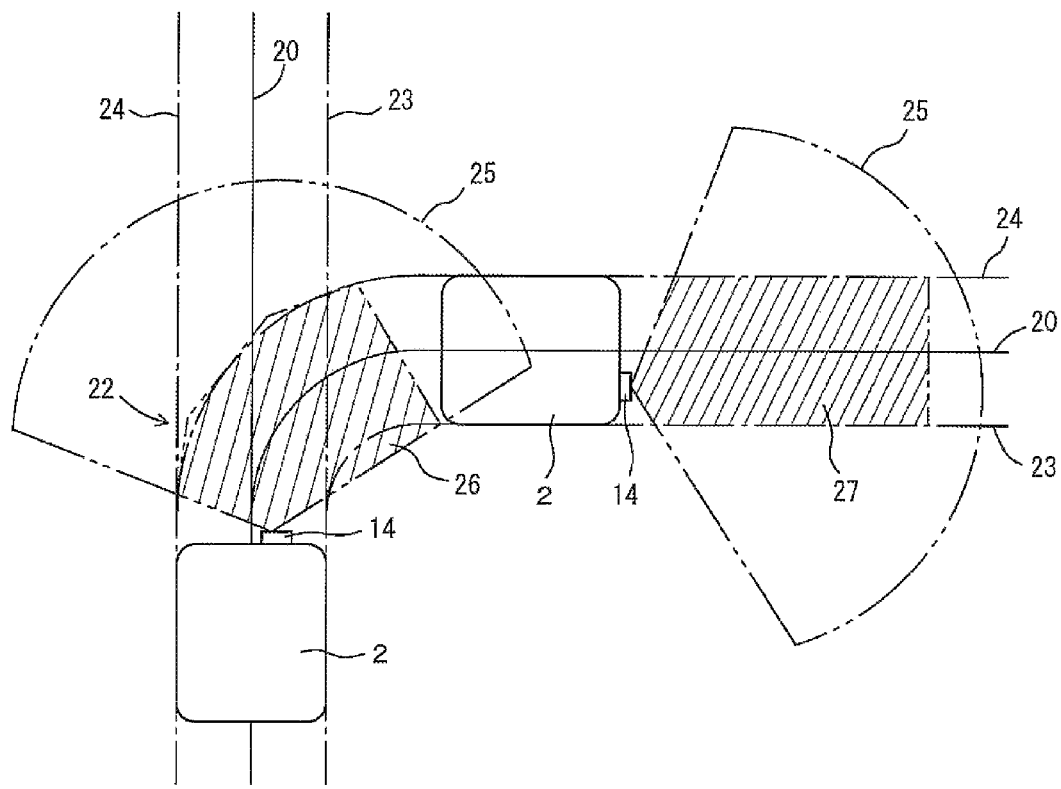
FIG. 3 is a diagram showing a detection area in the case where the traveling vehicle diverges from a diverging section.
Figure 4:
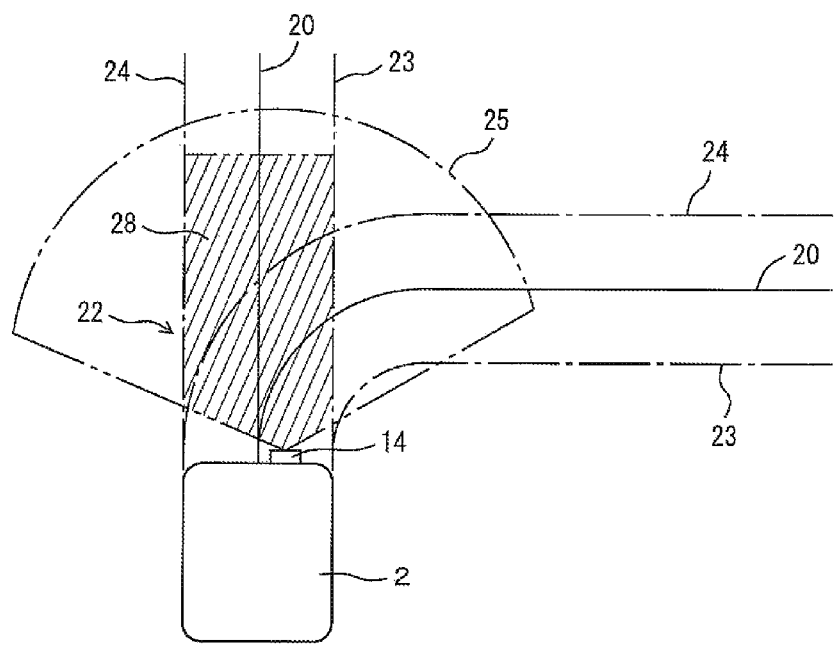
FIG. 4 is a diagram showing a detection area in the case where the traveling vehicle moves straight through the diverging section.
Figure 5:
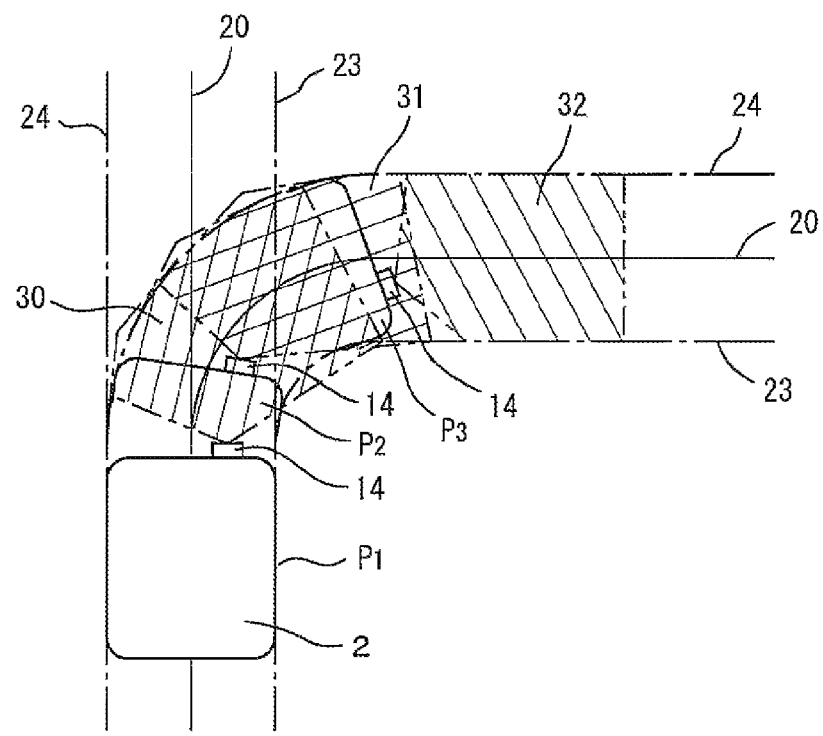
FIG. 5 is a diagram showing how the detection area changes in the case where the traveling vehicle diverges from the diverging section.

FIGS. 3 to 5 shows examples of detection areas 26 to 28, 30 to 32. A reference numeral 20 denotes the center of the travel rail of the traveling vehicle (overhead traveling vehicle) 2. Limits on the left and right sides of the travel rail center 20 where interference with the traveling vehicle 2 may occur are stored as interference limits 23, 24 in the map memory 6. A reference numeral 25 denotes a monitor range of the obstacle sensor 14. Hatched areas 26 to 28, 30 to 32 are detection areas. The detection areas 26 to 28, 30 to 32 are generated in real time based on the current position, velocity, and diverging direction of the traveling vehicle with reference to the map. Each of the detection areas 26 to 28, 30 to 32 is a range where deceleration is required if any obstacle is present within the area. Further, each of the detection areas 26 to 28, 30 to 32 is a range where if any obstacle is present at the front end of the areas 26 to 28, 30 to 32 as viewed from the traveling vehicle 2, the traveling vehicle 2 can stop before the obstacle. The expression "before" herein means that the front end of the traveling vehicle can stop before the obstacle.

For example, assuming that the traveling vehicle is decelerated at a constant velocity a, the distance required for the traveling vehicle 2 to stop is given by $v^2/2a$ where v denotes the current velocity. Therefore, if the length (depth) of the detection areas 26 to 28, 30 to 32 is defined as $v^2/2a$ or more, and the traveling vehicle 2 travels at a high velocity, the detection areas 26 to 28, 30 to 32 become long in the depth dimension. If the traveling vehicle 2 travels at a low velocity, the detection areas 26 to 28, 30 to 32 become short in the depth dimension. Therefore, each of the detection areas 26 to 28, 30 to 32 is an area required and sufficient to prevent interference with the obstacle. The obstacles are not limited to leading traveling vehicles. The obstacles may include working operators, instruments, and tools such as chairs and processing equipment. The detection area 28 of FIG. 4 is an example of a detection area in the case where the traveling vehicle moves straight through the diverging section. The detection area 27 is an example of a detection area in the case where the traveling vehicle passes through the diverging section to the straight section. Since the velocities of the traveling vehicle 2 in the detection areas 27, 28 are higher than the velocity of the traveling vehicle 2 in the detection area 26, the depths of the detection areas 27, 28 are larger than the depth of the detection area 26. Further, the orientation and the shape of the detection area 28 when the traveling vehicle 2 moves straight through the diverging section is different from those of the detection area 26 when the traveling vehicle diverges from the diverging section.

FIG. 5 shows how the detection area changes in correspondence with the position of the traveling vehicle diverging from the diverging section. A reference numeral 30 denotes a detection area when the traveling vehicle 2 is present at a position P1. A reference numeral 31 denotes a detection area when the traveling vehicle is present at a position P2. A reference numeral 32 denotes a detection area when the traveling vehicle is present at a position P3. The shape of the detection area changes in correspondence with the position on the travel route. For example, the detection area 31 and the detection area 30 are not similar, and the lengths of the detection areas 31 and the detection areas 32 change in correspondence with the velocity of the traveling vehicle 2. In this manner, a detection area including the diverging section, having the optimum shape in correspondence with the position and velocity on the travel route can be generated. The travel route in the diverging lane of the diverging section and the travel route in the curve section are similar. Also in the curve section, the orientation, the shape, and the length of the detection area are changed in correspondence with the distance from the entrance of the curve (distance from the exit of the curve).

Figure 6:
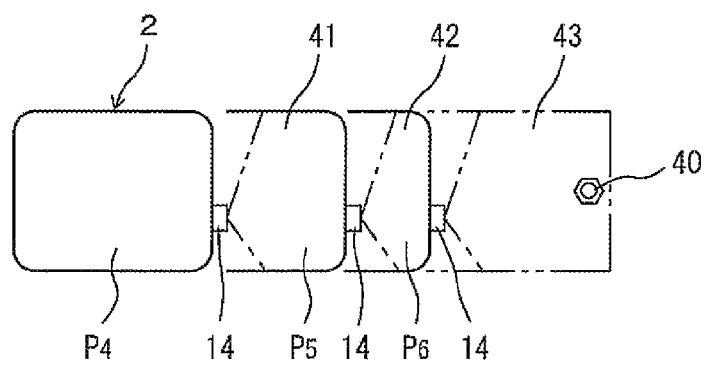
FIG. 6 is a diagram showing the position of a traveling vehicle and the change in the detection area in the case where the traveling vehicle is decelerated upon detection of an obstacle in the detection area.

FIG. 6 shows how the detection area changes when the position of the traveling vehicle 2 changes from P4 to P6. The front end positions of the detection areas 41 to 43 are substantially the same since the traveling vehicle 2 is decelerated while movement from the position P4 to the position P6. Assuming that an obstacle 40 is detected in the vicinity of the front end of the detection areas 41 to 43, deceleration of the traveling vehicle 2 is started at the position P4. At the position P5, the detection area is narrowed into the area 42. At the position P6, the detection area is narrowed further into the area 43. In this manner, the detection area is narrowed in correspondence with the velocity, and the front ends of the detection areas are kept at substantially the same position in order to keep track of the obstacle 40, and stop the traveling vehicle 2 before the obstacle 40.

In the above-described preferred embodiment, the following advantages are obtained.

Since the detection areas are preferably defined in real time, the detection areas are optimum for the positions and the velocities of the traveling vehicles.

Also in the case where the traveling vehicles pass through a diverging section, and where the optimum shape of the area changes in accordance with the positions in the diverging section, the optimum area can be generated in the same manner. Further, also in the case where the traveling vehicles pass through the merging section, it is required to change the shape of the detection area in real time. However, since the traveling vehicle moves in one direction in the merging section, no diverging control is required.

The detection areas are expanded or narrowed in correspondence with the velocities. Therefore, the inter-vehicle distances between the traveling vehicles are kept minimal, and improvement in the transportation efficiency is achieved.

Since the shapes of the detection areas are optimized in correspondence with the positions, there is no dead angle during detection.

Since the detection areas are not stored for each position of the travel route, it is sufficient to simply change the map when the travel route is changed.

An example of an application of the above-described preferred embodiment will be described. The detection area and information regarding whether any obstacle is present in the area or not are outputted to a controller on the ground, and displayed on a monitor. These items of data can be used, e.g., for verification or the like at the time of installation of the traveling vehicle system. Further, if an obstacle sensor having a detection range greater than 180°, e.g., 240° is adopted, for example, the obstacle sensor can detect traveling vehicles that travel through the merging section in parallel. Rules provided for the system may includes, e.g., a rule where a traveling vehicle that attempts to enter a merging section from a merging direction (a direction that is not the straight direction) should stop when it detects a traveling vehicle moving straight on a side closer to the merging section. In consideration with the rule, i.e., in consideration with the rule for other traveling vehicles that travel in parallel, the detection area showing a range in the merging section where the traveling vehicle stops depending on whether another traveling vehicle is present in the range is generated. In this manner, the traveling vehicle can determine whether it can enter the merging section or not under autonomous decentralized control.

While preferred embodiments of the present invention have been described above, it is to be understood that variations and modifications will be apparent to those skilled in the art without departing the scope and spirit of the present invention. The scope of the present invention, therefore, is to be determined solely by the following claims.

DESCRIPTION OF THE NUMERALS

2: traveling vehicle
4: travel controller
6: map memory
8: stop position calculator
10: detection area generator
12: interference detector
14: obstacle sensor
20: travel rail center
23, 24: interference limit
25: monitor range
26: detection area
40: obstacle
41 to 43: detection area

What is claimed is:

1. An overhead traveling vehicle system comprising:
overhead traveling vehicles each including an obstacle sensor configured to detect a distance to an obstacle and an orientation relative to the obstacle;
a map memory configured to store a map of a travel route of the overhead traveling vehicles;
a detection area generator configured to repeatedly define detection areas from the map based on current positions of the overhead traveling vehicles, the overhead traveling vehicles being decelerated if any obstacle is present in the detection areas;
an interference detector configured to detect an obstacle in the detection area, among obstacles detected by the obstacle sensor; and
a travel controller configured to control deceleration of the overhead traveling vehicles to prevent interference with the obstacle detected by the interference detector; wherein
the detection area generator is configured to:
determine interference ranges ahead of the overhead traveling vehicles where obstacles in the interference ranges may cause interference with the overhead traveling vehicles, from the map and based on the positions of the overhead traveling vehicles,
determine positions of front ends of the overhead traveling vehicles when the overhead traveling vehicles stop, based on current velocities of the overhead traveling vehicles, and
in the interference ranges, designate areas closer to the overhead traveling vehicles in comparison with the positions of the front ends as the detection areas, and
the travel route includes diverging sections configured to allow the overhead traveling vehicles to move straight or to diverge from the diverging sections; and
the detection area generator is configured to define different detection areas in the vicinity of the diverging sections into diverging directions and straight directions, according to directions in which the overhead traveling vehicles travel through the diverging sections.

2. The traveling vehicle system according to claim 1, the obstacle sensor being configured to scan areas ahead of the overhead traveling vehicles in traveling directions at predetermined intervals; and
the detection area generator being configured to define the detection areas synchronously with detection of the obstacle by the obstacle sensor.

3. A method of preventing interference between overhead traveling vehicles and obstacles, the method comprising the steps of:
detecting distances to the obstacles and orientations relative to the obstacles by obstacle sensors in the overhead traveling vehicles;
defining detection areas where deceleration of the overhead traveling vehicles is required if there is any of the obstacles in the detection areas, based on a map of a travel route of the overhead traveling vehicles and current positions of the overhead traveling vehicles;
detecting obstacles in the detection areas, from among the obstacles detected by the obstacle sensors; and
controlling deceleration of the overhead traveling vehicles to prevent interference between the overhead traveling vehicles and the obstacles in the detection areas; wherein
the step of defining detection areas includes:
determining interference ranges ahead of the overhead traveling vehicles where any of the obstacles in the interference ranges may cause interference with the overhead traveling vehicles, from the map and based on the positions of the overhead traveling vehicles,
determining positions of front ends of the overhead traveling vehicles when the overhead traveling vehicles stop, based on current velocities of the overhead traveling vehicles, and
in the interference ranges, designating areas closer to the overhead traveling vehicles in comparison with the positions of the front ends as the detection areas;
the travel route includes diverging sections configured to allow the overhead traveling vehicles to move straight or to diverge from the diverging sections; and
the step of defining the detection areas further includes defining different detection areas in the vicinity of the diverging sections into diverging directions and straight directions, according to directions in which the overhead traveling vehicles travel through the diverging sections.

* * * * *